United States Patent [19]
Claasen

[11] 3,755,895
[45] Sept. 4, 1973

[54] HERB SPOON
[76] Inventor: Antonius Bernardus Claasen, Sperwerlaan 4, Leende, Netherlands
[22] Filed: Mar. 30, 1971
[21] Appl. No.: 129,377

[30] Foreign Application Priority Data
Feb. 17, 1971 Canada .................. 105656

[52] U.S. Cl. .................. 30/326, 99/77.1
[51] Int. Cl. .................. B26b 21/54
[58] Field of Search .................. 30/325, 326; 210/470, 471; 99/77.1; 38/325–326

[56] References Cited
UNITED STATES PATENTS
| | | | |
|---|---|---|---|
| 783,235 | 2/1905 | Argersinger | 210/470 |
| 1,708,456 | 4/1929 | Tunick | 30/326 |
| 2,087,796 | 7/1937 | Cooper | 99/77.1 |
| 3,054,184 | 9/1962 | Wyner | 30/326 |

FOREIGN PATENTS OR APPLICATIONS
449,872 4/1968 Switzerland .................. 30/326

Primary Examiner—Robert C. Riordon
Assistant Examiner—J. C. Peters
Attorney—Waters, Roditi, Schwartz & Nissen

[57] ABSTRACT

A herb spoon comprising a handle and a scoop secured thereto, said scoop forming a dosage container to which there is hinged a lid securable to the dosage container in its closed position by snap action, while the container, or the container and the lid is or are provided with perforations, which perforations may be grid-like to increase the contacting surface, while the cross-sectional area of said perforations may decrease from the interior to the exterior.

1 Claim, 4 Drawing Figures

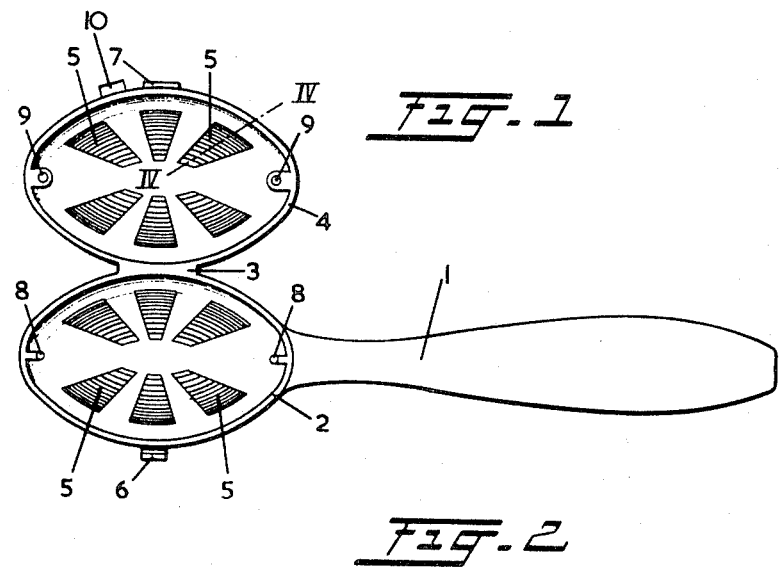
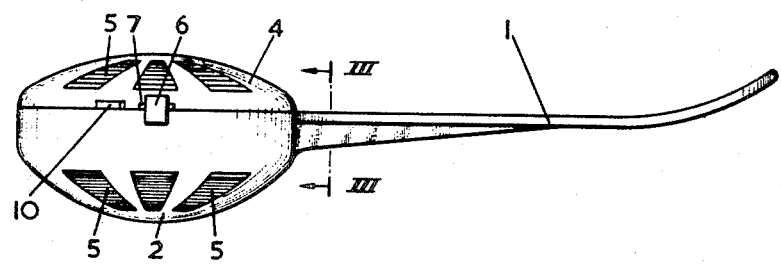
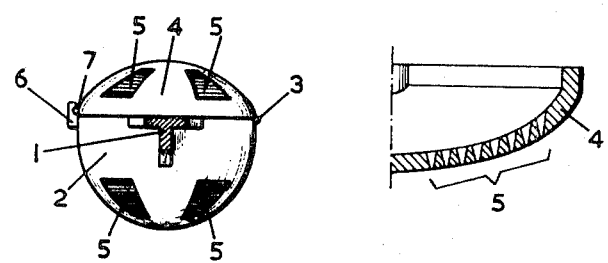

HERB SPOON

The invention relates to a herb spoon, comprising a handle and secured thereto a scoop, which can easily be filled with a predetermined dose of herbs and is then very well suited to extract the herbs in water. According to the invention, the scoop forms a dosage container to which there is hinged a lid which can be secured to the dosage container in its closed position by snap action, while the container, or the container and the lid, is or are provided with perforations.

The spoon may be produced of metal, however also of plastic, resilient material, such as polypropylene. The advantage of the latter construction is that the present herb spoon can be produced entirely in one piece, the hinge being formed by a thin connecting strip between the two parts.

Owing to the depth of the container, which is directly secured to the handle, it is eminently suited for scooping constant doses of herbs and consequently forms a dosage spoon. Owing to the perforation, this dosage spoon may also be used as a stirring spoon for extracting the herbs.

To increase the contacting surface, the perforations may be grid-like.

Furthermore the cross-sectional area of the perforations may decrease from the interior to the exterior. This is important for herb components for medical purposes; for these components contain substances which release saponins and slimy substances. If a well-known herb spoon with small, round perforations should be used for extracting such herb components, the perforations would soon get clogged after immersion of the spoon in a liquid, because the saponin or a similar substance immediately released during this immersion forms a film in or over the perforations owing to its surface tension reducing effect, on which slimy substances deposit, as a result of which the perforations are closed and the spoon gets clogged, so that an optimal extraction of the herb composition is rendered impossible.

The invention will be described in greater detail with reference to the drawing.

FIG. 1 shows the herb dosing spoon in open condition in top view;

FIG. 2 shows the herb dosing spoon in closed condition in side elevational view;

FIG. 3 is a view from the handle side of the closed herb dosing spoon and

FIG. 4 is a sectional view on the line IV—IV in FIG. 1.

As can be seen in the drawing, a cup-shaped container 2 is connected to a handle 1 of a herb dosing spoon, to which container the lid 4 is attached by a hinge 3. In the wall of the container 2 and of the lid 4 there are grid portions 5 formed by perforations.

As clearly appears from FIG. 4, the cross-sectional area of the perforations decreases from the interior to the exterior, so that on the one hand the greatest possible permeability is formed, while on the other hand it is prevented that the herbs or substances thereof in the spoon come into the extract during the extraction.

The spoon may be produced of metal, but also, as in the example shown, of polypropylene or a similar thermoplastic material. The hinge 3 is formed of a thin flexible strip portion. During manufacturing, a lug 6 is formed on the edge of the container 2, which lug snaps over the edge of the lid 4 when closing the lid 4, so that the two parts are fixed in the closed position.

For a proper centering of the lid relative to the scoop, two coacting centering means 8 and 9 are attached to the latter.

Besides, for easy opening the lid, an engaging lip 10 is formed on it.

I claim:

1. A herb spoon comprising a handle and a scoop secured thereto, a lid hingedly connected to said scoop so as to form an openable or closable dosing container, said lid and said scoop having a releasable snap closure for securing said dosing container in a closed position, and said container and lid being provided with a plurality of elongate perforations, said perforations each having a gridshaped configuration, the cross-sectional area of each of the perforations decreasing in width from the interior to the exterior of said spoon.

* * * * *